United States Patent [19]

Hirose

[11] Patent Number: 4,975,781
[45] Date of Patent: * Dec. 4, 1990

[54] APPARATUS FOR PREVENTING PAPER CLOGGING IN A RECORDING DEVICE

[75] Inventor: Kunihiko Hirose, Chofu, Japan

[73] Assignee: Kabushiki Kaisha Toshiba, Kawasaki, Japan

[*] Notice: The portion of the term of this patent subsequent to Jun. 4, 2006 has been disclaimed.

[21] Appl. No.: 42,829

[22] Filed: Apr. 27, 1987

[30] Foreign Application Priority Data

Apr. 25, 1986 [JP] Japan ............................. 61-62941[U]

[51] Int. Cl.$^5$ ............................................. H04N 1/21
[52] U.S. Cl. .................................... 358/304; 355/310; 346/24
[58] Field of Search ........................ 355/310; 358/304; 346/24

[56] References Cited

U.S. PATENT DOCUMENTS 3,922,082 11/1975 Cavallaro et al. .................. 355/310
4,560,990 12/1985 Sue et al. ............................. 358/304

Primary Examiner—Leo P. Picard
Assistant Examiner—Lincoln Donovan
Attorney, Agent, or Firm—Banner, Birch, McKie & Beckett

[57] ABSTRACT

A recording apparatus of the type using a roll of recording paper in which recording paper unrolled from the roll is cut by a rotary cutter after completion of a recording operation and thereby a section of recording paper on which recording has been effected is cut from the roll is discharged into a tray. The apparatus includes at least one transporting roller before the cutter. The cutter also includes a rotary blade and a stationary blade. The recording apparatus further comprises guide plates which include an upper guide plate and lower guide plate, in order to guide the recording paper to the cutter. The upper guide plate corresponds to the rotary blade and the lower guide plate corresponds to the stationary blade. The cutter and the guide plates are arranged so as to leave a gap between a shearing edge of the stationary blade and a guiding surface of the lower guide plate. When recorded paper is discharged into the tray, there may be a bend in the recording paper that could cause a rearmost end of the cut recording paper to enter into the cutter. However, even if the rearmost end does enter into the cutter and remains on the stationary blade, a foremost end of the next section of recording paper to be cut is transported above the rearmost end due to the gap. Therefore, the likelihood of interference between the recording paper and recording paper that has been cut is greatly reduced.

22 Claims, 2 Drawing Sheets

APPARATUS FOR PREVENTING PAPER CLOGGING IN A RECORDING DEVICE

BACKGROUND OF THE INVENTION

1. Field of the Invention

The present invention relates to a recording apparatus and, more particularly, to an apparatus for transporting and cutting a recording medium. This application is related to Applicants' copending application Ser. No. 018,553, now U.S. Pat. No. 4,839,732 and entitled "Apparatus and Method For Transporting And Cutting A Recording Medium."

2. Description of the Prior Art

As is well known, a recording apparatus of the type using a roll of recording paper is used in facsimile receivers and other printers. In a typical apparatus, the recording paper is unrolled from the roll, transported past a recording head, such as a thermal recording head, and information is recorded on the paper by the recording head. After completion of the recording operation, the recording paper is further transported a predetermined distance and a cutting operation is performed. The paper is then stored in a storage tray.

The most convenient position for the storage tray is immediately adjacent the cutting device since paper that has been cut can fall immediately into the tray. A recurring problem has been found, however, in recording devices thus arranged. As the paper moves into the tray, a bend frequently occurs due to interference between the recording paper and sections of the recording paper that have previously been cut and discharged into the tray. The paper may also bend due to the fact that it has been stored on a roll and is predisposed to a bent configuration. After the cutting operation, this bend will sometimes cause the paper to move back into the cutting device, causing undesirable paper clogging and frequently resulting in the same section of the recording paper being cut more than once. In response to this serious problem, many prior art devices use feed rollers after the cutting device to transport the cut section of the recording paper to a tray located some distance from the cutting device. In this way, the cut paper could not become clogged in the cutting device.

Although the use of feed rollers helped to eliminate the problem of paper clogging, several new and equally disturbing problems were created. Using feed rollers beyond the cutting device requires that the tray and the cutting device be some distance apart. This requirement makes it difficult to manufacture a compact recording device. As the technology of recording devices has improved, the size of the devices has decreased. The use of feed rollers places an unwanted limitation on the size of the device. The use of feed rollers also increases the cost of production and increases the overall complexity of the device which will necessitate additional maintenance and repair.

SUMMARY OF THE INVENTION

It is, therefore, the primary object of the invention to provide a compact and low cost recording apparatus capable of transporting and cutting a recording medium without any occurrence of paper clogging.

It is another object of the invention to provide a recording apparatus that will cut each section of a recording medium only once.

It is still another object of the invention to provide a recording apparatus that does not need feed rollers to transport a cut recording paper to a storage tray.

According to the invention, there is provided a recording apparatus capable of transporting recording paper to an exit, such as a tray, without any transporting feed rollers between the cutter and the tray and without an undue risk that the paper will become clogged in the cutting device. The recording apparatus comprises a recording head for recording information on a section of the recording paper, at least one transporting roller for transporting the recorded paper from the recording head to a cutter and a pair of guide plates for guiding the recorded paper to the cutter. The cutter includes a rotary blade and a stationary blade. The guide plates include a first guide plate and a second guide plate, the first guide plate corresponding to the rotary blade and the second guide plate corresponding to the stationary blade. The cutter and the guide plates are arranged so as to leave a gap between a shearing edge of the stationary blade and a guiding surface of the second guide plate. After the recording operation is completed, the recording paper is moved forward to a predetermined position depending on the desired length of the recorded page such that the desired point at which the paper is to be cut is moved to the cutter. Thereafter the recording paper is cut at the desired cutting point by the cutter. The tray is located just beyond the cutter, and the cut section the recording paper is discharged into the tray.

As discussed above, the rearmost end of the cut paper may be pushed back into the cutter after the cutting operation. If this does occur, the paper will sit on the lower stationary blade. Since there is a gap between the shearing edge of the stationary blade and the guiding surface of the second guide plate, a foremost end of the next section of the paper is transported above the rearmost end of the discharged section. The rearmost end of the previously cut paper is then moved forward by a frictional force between the two paper sections and drops out of the cutter. Thus, the likelihood of an occurrence of interference between the recording paper being cut and the discharged section of the recording paper that has been cut is reduced by the gap. For example, if the shearing edge of the stationary blade is too close to the guiding surface of the second guide plate, the foremost end of the next section may stride against the rearmost end of the cut section that remains on the stationary blade and paper clogging will occur. The present invention avoids this problem since, if the rearmost end of the cut section is pushed into the cutter, it will remain on the stationary blade a small distance from the guiding surface of the second guide plate, and the probability of a paper collision will be greatly reduced.

DESCRIPTION OF THE PREFERRED EMBODIMENTS

Figure 1:
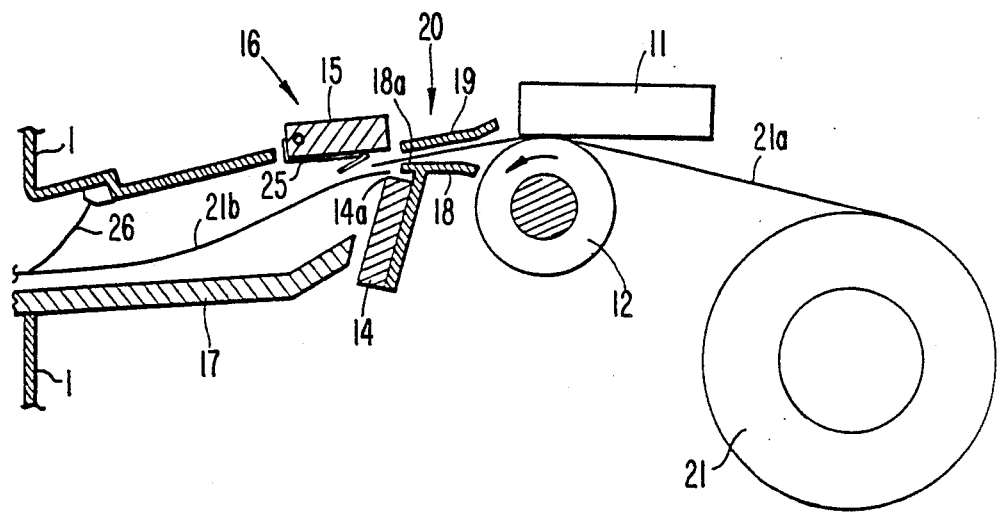
FIG. 1 is a fragmented cross-sectional view of a preferred embodiment of a recording apparatus according to the invention.

A preferred embodiment of this invention is shown in FIG. 1 and includes casing 1 in which thermal recording head 11, platen roller 12, rotary cutter 16, storage tray 17, guide plates 20, and thermosensitive rolled recording paper 21 are disposed. For illustrative purposes, the invention is described in a facsimile receiver. The cover frame of casing 1 has a hinged construction and platen roller 12 is brought into contact with recording head 11 when the cover frame of casing 1 is closed. Recording paper 21a, unrolled from rolled recording paper 21, is held between platen roller 12 and recording head 11. Recording paper 21a is transported when platen roller 12 is rotated by a step motor (not described). Recording head 11 includes a line of heat generating elements. A line of recording signals, each bit of which corresponds to one of the heat generating elements, is supplied to recording head 11. The heat elements then generate enough heat to cause the thermosensitive recording paper 21 in contact therewith to darken thereby imparting the recorded information on the recording paper.

Rotary cutter 16 includes stationary blade 14 and rotary blade 15. Recording paper 21a is positioned between blades 14 and 15 and is cut by a downward turn of rotary blade 15. After cutting recording paper 21a, rotary blade 15 moves upward to its initial position, leaving a narrow space between blades 14 and 15. Elastic plate 25 is installed on the bottom of rotary blade 15 means of an adhesive or some other appropriate method, and assists in dropping the section of cut recording paper 21b into tray 17 installed just beyond cutter 20. Therefore, recording paper 21b, cut off from the roll of recording paper 21, is discharged to, and stored in, tray 17. Electrostatic discharger 26 is installed in the cover frame of casing 1 and discharges static electricity on recording paper 21a.

Figure 2:
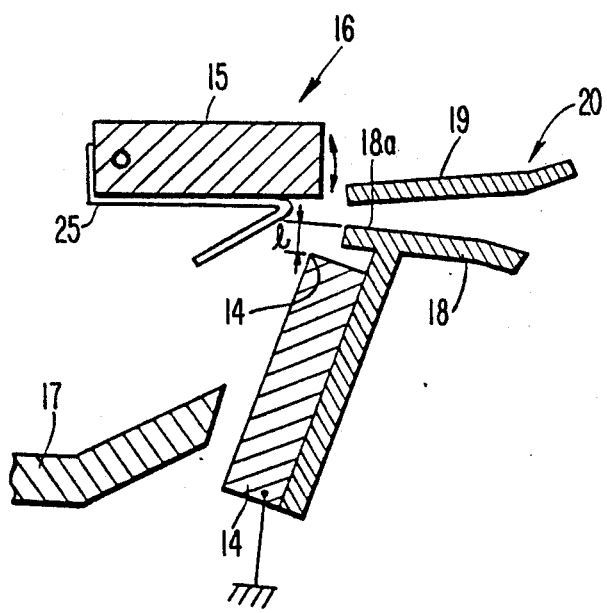
FIG. 2 is a magnified cross-sectional view of the apparatus of FIG. 1.

Guide plates 20 include T-shaped lower guide plate 18 and upper guide plate 19, and guides recording paper 21a into the narrow space between blades 14 and 15. Lower guide plate 18 is installed on stationary blade 14 by means of a screw so as to leave a gap 1 between shearing edge 14a of stationary blade 14 and guiding surface 18a of guide plate 18, as shown in FIG. 2. The gap 1 is designed to prevent the occurrence of interference between cut recording paper 21b and the next portion of recording paper 21a transported to the cutter. In the preferred embodiment, gap 1 is about 0.5 mm–2.0 mm and the horizontal distance between shearing edge 14a and the foremost end of guide plate 18 is about 2.0 mm. If gap 1 is formed larger than about 2.0 mm, the incident path of recording paper 21a may not be perpendicular to the shearing surface of the rotary cutter 16. Although the shearing force of rotary cutter 16 is strongest when the incident path of recording paper 21a can be effectively cut if the angle of recording paper 21a is within 20° of the perpendicular position.

The operation of the facsimile receiver will now be described. In an initial state (in a waiting state), the foremost end of recording paper 21a is positioned between guides 20, i.e., after the last cutting operation, the leading edge of recording paper 21a was moved to a position between guide plates 20 as described below. When the facsimile receiver receives control signals and information signals from a facsimile transmitter, the receiver decodes and demodulates the information signals using the control signals and produces recording signals. The circuitry used to perform these operations is well known and is not described herein. A control circuit (also well known and not described herein), in response to these signals, causes platen roller 12 to rotate in a clockwise direction for a predetermined period in order to move recording paper 21a back toward recording head 11 so that the portion of the paper between guide plates 20 and the recording head is not wasted. The recording operation is then carried out.

The lines of recording signals are supplied to recording head 11 and platen roller 12 is simultaneously rotated in a counter-clock-wise direction in synchronism with each line of the recording operation. Thus, the recording operation is initiated and thereafter recording paper 21a is transported through cutter 20 during the recording operation. When the control circuit determines that one page has been completed, recording signals are no longer supplied to recording head 11. However, platen roller 12 continues to rotate for a predetermined period so that the desired cutting point of recording paper 21a moves to the cutting position of cutter 20. Recording paper 21a is then cut at the cutting point. The section of recording paper 21b cut off in this way is discharged into tray 17.

If more recording signals are received, the new foremost end part of recording paper 21a is moved back to the recording operation starting position and the next recording operation is carried out. On the other hand, if more recording signals are not received, the new foremost end part of recording paper 21a is moved to a position between guide plates 18 and 19 since it is not desirable to leave the paper immediately adjacent the cutter while waiting for the next recording operation. If the paper is left adjacent the cutter, the cutter may become clogged due to the build up of short strips of paper caused by incorrect actuation of the cutter. The cutter may also rust if kept in direct contact with coated material on the recording paper for a long period of time.

As previously discussed, since storage tray 17 is positioned immediately adjacent cutter 16, there is a tendency for a cut section of paper to fail to completely discharge into tray 17. FIG. 1 shows section 21b that has remained in cutter 16 after being cut. This phenomenon is most frequently caused by interference between the recording paper and sections of the recording paper that have previously been cut and discharged into tray 17. Static electricity will frequently build up on the recording paper and although this device includes electrostatic discharger 26, some static electricity may remain and contribute to the interference between sections of recording paper as they pass into the tray. The paper also has a tendency to bend since it has been stored on a roll and is predisposed to a bent configuration.

In prior art devices, when a cut section of paper remains in or is pushed back into the cutter, the next sheet of paper will frequently collide with the previously cut sheet and cause a paper clog in the cutter.

As can be clearly seen in FIG. 1, however, the sheet of paper moving into the cutter is not interfering with sheet 21b due to the gap formed between cutting edge 14a and paper guide 18. The next sheet will pass over sheet 21b and the frictional contact between the two sheets will push sheet 21b into tray 17, thus eliminating the danger of paper clogging.

Figure 3:
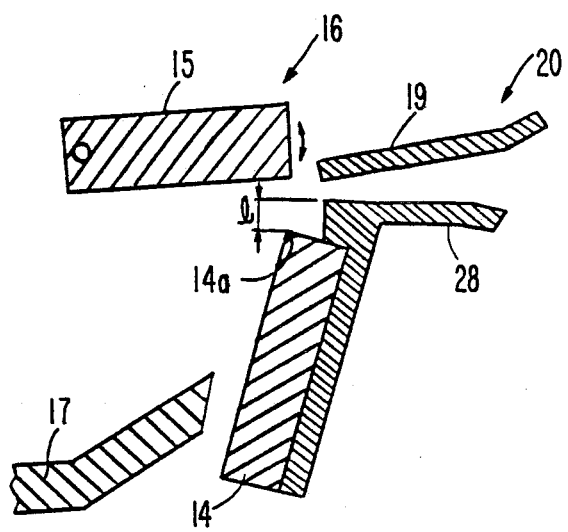
FIG. 3 is a cross-sectional view of another embodiment of the recording apparatus according to the invention.
Figure 4:
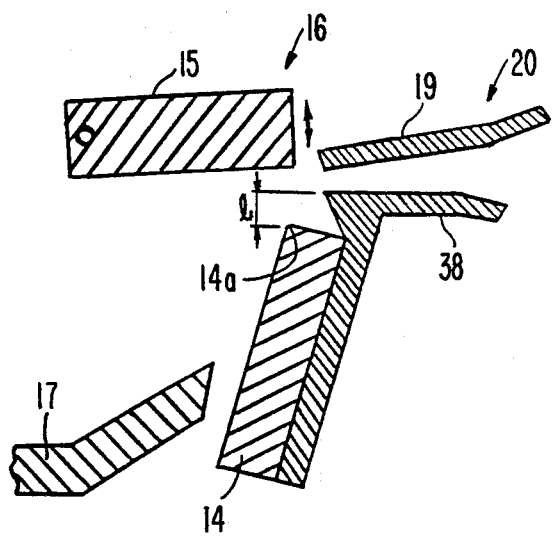
FIG. 4 is a cross-sectional view of a further embodiment of the recording apparatus according to the invention.

The exact shape of the guide member 18 may be varied and alternative embodiments are shown in FIGS. 3 and 4. In FIG 3, guide plate 28 is in contact with the upper surface of stationary blade 14. FIG. 4 shows a guide plate 38 with an extended portion that intersects the upper surface of blade 14 at some acute angle.

Various changes may be made within the purview of this invention in the form, details, proportions and arrangement of parts without departing from the spirit of the invention, and no undue limitations are to be inferred or implied form the foregoing disclosure.

I claim:

1. A recording apparatus comprising:
   a recording medium on which information can be recorded;
   recording means for recording the information on a section of said recording medium;
   transporting means for transporting said recording medium;
   cutting means including an upper blade and a lower blade spaced from said upper blade, one of said blades being movably engageable with the other of said blades for cutting said recording medium at a predetermined cutting point;
   guide means including first and second spaced guide means for guiding said section of said recording medium between said upper blade and said lower blade, said first guide means corresponding to said upper blade and said second guide means corresponding to said lower blade,
   a gap being provided between a shearing edge of said lower blade and a guiding surface of said second guide means for reducing the likelihood of interference between said section of said recording medium and a section of said recording medium that has previously been cut.

2. A recording apparatus according to claim 1 wherein said upper blade is movable and said lower blade is stationary.

3. A recording apparatus according to claim 1 further comprising storage means for storing sections of said recording medium that have been cut by said cutting means, said storage means positioned immediately adjacent said cutting means such that said sections of said recording medium that have been cut by said cutting means are discharged into said storage means after being cut at the predetermined cutting point.

4. A recording apparatus according to claim 3 wherein said storage means comprises a tray.

5. A recording apparatus according to claim 1 wherein said recording medium comprises a roll of recording paper.

6. A recording apparatus according to claim 1 wherein said movable blade is a rotary blade.

7. A recording apparatus according to claim 1 wherein said second guide means comprises an extended portion extending towards said cutting means.

8. A recording apparatus according to claim 7 wherein said extended portion is at a predetermined distance from a top surface of said stationary blade.

9. A recording apparatus according to claim 7 wherein said extended portion is in contact with a top surface of said stationary blade.

10. A recording apparatus according to claim 7 wherein said extended portion intersects a top surface of said stationary blade at a predetermined angle.

11. A recording apparatus according to claim 10 wherein said predetermined angle is acute.

12. A recording apparatus according to claim 1 wherein said second guide means is attached to said stationary blade.

13. A recording apparatus according to claim 1 wherein said transporting means comprises a platen roller, said recording medium being held between said platen roller and said recording means.

14. A recording apparatus comprising:
    a recording medium on which information can be recorded;
    recording means for recording the information on a section of said recording medium;
    transporting means for transporting said recording medium;
    cutting means including an upper blade and a lower blade spaced from said upper blade, one of said blades being movably engageable with the other of said blades for cutting said recording medium at a predetermined cutting point; and
    guide means for guiding said section of said recording medium between said blades, said guide means guiding said section of said recording medium a predetermined distance away from said lower blade in order to reduce the likelihood of interference between said section of said recording medium and a section of said recording medium that has previously been cut.

15. A recording apparatus according to claim 14 wherein said upper blade is movable and said lower blade is stationary.

16. A recording apparatus according to claim 14 wherein said guide means comprises a first guide member corresponding to said stationary blade and a second guide member corresponding to said movable blade.

17. A recording apparatus according to claim 16 wherein said second guide member comprises an extended portion extending toward said cutting means.

18. A recording apparatus according to claim 17 wherein said extended portion is a predetermined distance from a top surface of said stationary blade.

19. A recording apparatus according to claim 14 wherein said predetermined distance is between 0.5 mm and 2.0 mm.

20. A recording apparatus according to claim 17 wherein said extended portion is in contact with a top surface of said stationary blade.

21. A recording apparatus according to claim 14 further comprising storage means for storing sections of said recording medium that have been cut by said cutting means, said storage means positioned immediately adjacent said cutting means such that said sections of said recording medium that have been cut by said cutting means are discharged into said storage means after being cut at the predetermined cutting point.

22. A recording apparatus comprising:
    a recording medium on which information can be recorded;
    recording means for recording the information on a section of said recording medium;
    transporting means for transporting said recording medium;
    cutting means including an upper blade and a lower blade spaced from said upper blade, one of said blades being movably engageable with the other of said blades for cutting said recording medium at a predetermined cutting point;
    guide means including first and second spaced guide means for guiding said section of said recording medium between said upper blade and said lower blade, said first guide means corresponding to said upper blade and said second guide means corresponding to said lower blade, a gap being provided between a shearing edge of said lower blade and a guiding surface of said second guide means for reducing the likelihood of interference between said section of said recording medium and a section of said recording medium that has previously been cut; and storage means for storing sections of said recording medium that have been cut by said cutting means, said storage means positioned immediately adjacent said cutting means such that said sections of said recording medium that have been cut by said cutting means are discharged into said storage means after being cut at the predetermined cutting point.

* * * * *